July 28, 1936.    C. L. EKSERGIAN    2,049,052
REENFORCED ARTILLERY WHEEL
Filed April 4, 1932

INVENTOR.
CAROLUS L. EKSERGIAN.
BY John P. Fairbox
ATTORNEY.

Patented July 28, 1936

2,049,052

UNITED STATES PATENT OFFICE 2,049,052

REENFORCED ARTILLERY WHEEL

Carolus L. Eksergian, Detroit, Mich., assignor to Budd Wheel Company, Philadelphia, Pa., a corporation of Pennsylvania Application April 4, 1932, Serial No. 603,086

14 Claims. (Cl. 301—6)

This invention relates to vehicle wheels and more particularly to wheels of the artillery type and has for its principal object the construction of a structurally strong wheel body made from a single sheet metal member.

The dominant feature of my invention is to construct a single stamping wheel body using a reenforcing annulus having a plurality of circumferentially spaced offset portions or projections for interlocking relationship with the spoke portions of the wheel body.

Another object of my invention is to construct the reenforcing annulus and brake drum head so as to obtain an additional bearing seat interposed between the said parts.

The box sections created in this construction reinforce the disc and allow a shortening of the spokes, and the use of a hub flange of small radial extent. The construction also simplifies the drawing operations in the forming of the wheel body.

My invention will be better understood from the following description when considered in connection with the accompanying drawing and its scope will be pointed out in the appended claims.

In the accompanying drawing wherein like ordinals represent corresponding parts in the various figures, Figure 1 illustrates a side elevation of a wheel constructed in accordance with my invention.

Figure 1:
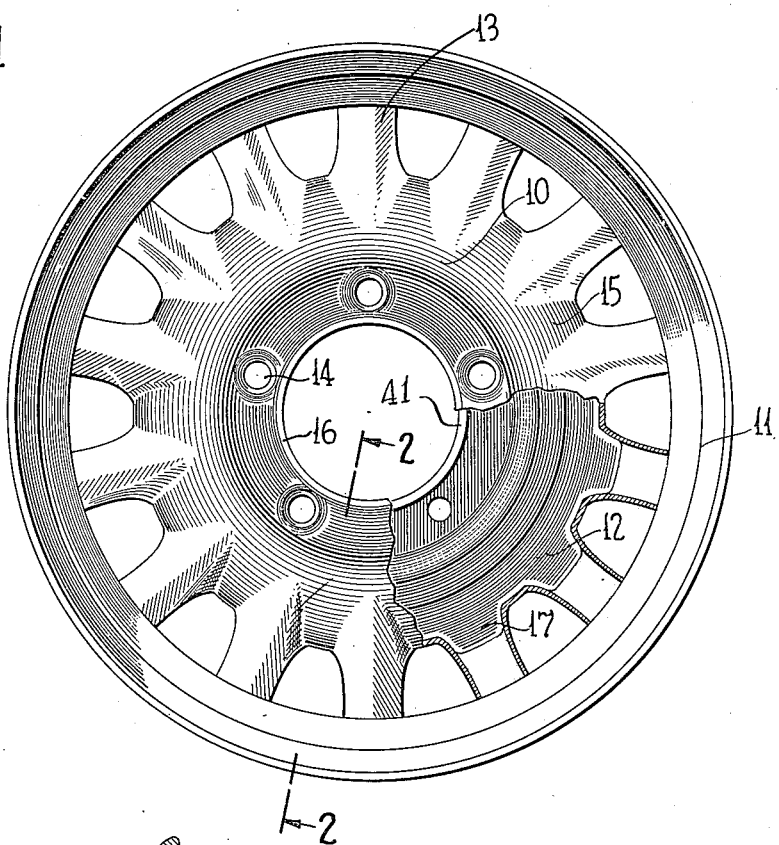
Figure 2:
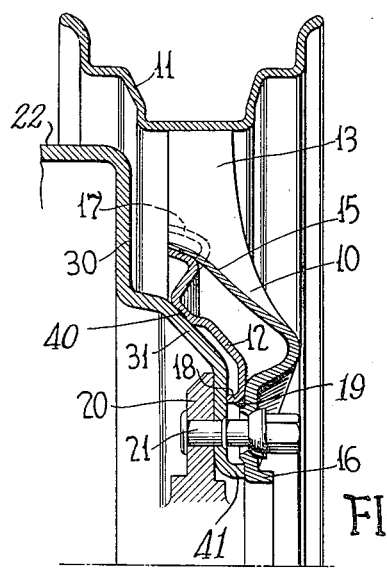
Figure 2 is a cross section on the line 2—2 of Figure 1 showing an interlock of the reenforcing annulus with the wheel body.

Referring to the drawing, there is shown a wheel body constructed in accordance with this invention. The wheel is composed of a single stamping artillery wheel body 10, a rim member 11 herein indicated as of the conventional drop center type and the reenforcing annulus 12. The wheel body comprises a plurality of spokes 13 merging at their inner radial extremities into an annular nave portion having a conical spoke bearing portion extended radially inwardly by an axially extending portion and terminating in a radially extending bolting-on flange carrying a plurality of bolt receiving openings 14 comprising the bolting on circle. The annular nave includes a plurality of portions 15 extending axially inwardly between adjacent spokes forming reenforcing webbings. The innermost radial extremity of the stamping is shown as being turned axially outwardly at 16, to form the central axle or hub receiving portion.

The reenforcing annulus 12 comprises a substantially frustro-conical section extending radially outwardly having a scalloped outer periphery, the projections 17 thereof extending into the spokes in interlocking relationship therewith. The reenforcement at its radial innermost portion is turned axially inwardly as at 18 and is secured to the bolting-on flange of the main wheel body adjacent thereto as by means of arc welding 19, as shown. The brake drum 30 has a substantially conical section 31 forming a bearing seat 40 with the reenforcing annulus 12 radially inwardly of the braking flange 22, and a radially extending portion substantially co-extensive with the hub flange 20 and secured thereto by means of studs 21. The innermost radial portion 41 of the brake drum is turned axially outwardly thus co-operating with the axially inwardly turned portion 18 of the reenforcing annulus to create a resilient box section securement zone. The reenforcing annulus is spaced from the nave portion of the main wheel body thus giving a substantial box section nave construction.

Figure 3:
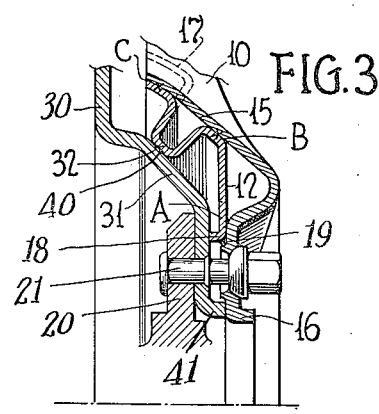
Figure 3 is a partial cross section similar to Fig. 2 showing a modified reenforcing annulus.

In Figure 3 is shown a modified form of reenforcing annulus telescoping within the reenforcing webbings 15 of the main wheel body and having an offset portion 32 seated on the brake drum 30. In this modification the reenforcing annulus is secured in a plurality of radially spaced zones A, B and C to the main wheel body as by welding. The interlocking relationship with the spokes is likewise used in this modification, as indicated at 17.

The rim 11 shown as of the conventional drop center type, is secured in permanent relation to the spoke section periphery by any suitable means.

An important feature of my device is the interlocking relation of the reenforcing annulus and spoke body whereby the weaving of the spokes is eliminated. The substantially frusto-conical section of the wheel body is peripherally complete irrespective of the corrugations due to the spoke formation and is consequently of high section modulus.

The wheel securing zone is of substantially double cantilever construction due to the reversely extending axial flanges 41 and 18 of the brake drum member and the wheel body member at their radially innermost portions giving a resilient locking relation in the bolting on circle.

Modifications will be obvious to those skilled in the art and I do not therefore wish to be limited except by the scope of my sub-joined claims as interpreted in the light of the generic spirit of my invention.

What is claimed is:

1. A vehicle wheel including, in combination, a hub, a brake drum secured to said hub, a single stamping wheel body also mounted upon said hub and comprising a plurality of spokes merging into an annular nave portion, said nave portion including a plurality of portions extending axially inwardly between adjoining spokes to form reenforcing webbings therebetween, and a reenforcing annulus telescoped within said reenforcing webbings, said reenforcing annulus including an offset portion seated upon a portion of the brake drum.

2. A vehicle wheel including, in combination, a single stamping artillery wheel body comprising a bolting-on flange and a plurality of spokes merging into an annular nave portion extending outwardly from said bolting-on flange, said nave portion including a plurality of portions extending axially inwardly between adjoining spokes to form reenforcing webbings therebetween of deep cone section, and a reenforcing annulus telescoped within said reenforcing webbings, said reenforcing annulus being permanently secured to said wheel body in radially spaced zones, located, respectively, at the periphery of said nave and the radially outer portion of said bolting-on flange and spaced therefrom intermediate said zones of securement to constitute a box section reenforcement for the nave of the wheel in the region outwardly of the bolting-on flange, said reenforcing annulus including radially offset portions extending into the inner ends of the spokes and annularly interlocked therewith.

3. A vehicle wheel of the demountable bolted on type including, in combination, a single stamping artillery type wheel body including a plurality of spokes merging at their inner radial portions into an annular nave, and a reenforcing annulus secured in plural radial zones to said nave, and defining with said single stamping multiple seating zones for said wheel, a plurality of said zones comprised by portions of said annulus.

4. A vehicle wheel of the demountable bolted on type including, in combination, a single stamping artillery type wheel body including a plurality of spokes merging at their inner radial portions into an annular nave, and a reenforcing annulus secured in plural radial zones to said nave and having portions interlocked with each of said spokes, said annulus with said stamping defining multiple seating zones for said wheel.

5. A vehicle wheel including, in combination, a single stamping artillery type wheel body including a plurality of spokes merging at their inner radial portions into an annular nave, and a reenforcing annulus secured in plural radial zones to said nave and including portions interlocked with each of said spokes, and said annulus with said single stamping defining multiple seating zones for said wheel, a plurality of said zones comprised by portions of said annulus.

6. A pressed metal artillery wheel body of the demountable bolted on type having a substantially radial bolting-on flange, a spoke bearing portion extending radially outwardly thereof having a deeply dished generally conical disc like form, spokes having root portions of axially increasing depth pressed from said conical portion and main bodies merging with the outer axially deepest portions of the roots and extending therebeyond, a portion connecting said flange and spoke bearing portion forming with the latter a substantially annular channel facing axially and an annulus having a corrugated outer peripheral portion secured to portions of the wheel body in bridging relation to said channel, and in interlocking relation with said spokes.

7. A pressed metal vehicle wheel of the demountable bolting on type including, in combination, a single stamping artillery type wheel body comprising a plurality of spokes merging at their inner radial extremities into an annular nave portion and extending radially inwardly thereof into a substantially radially extending mounting flange containing a bolt hole circle, and an annulus secured to the nave portion of said wheel body in plural zones, and also extending radially inwardly and terminating substantially at the outer periphery of the mounting flange and secured thereto, the said annulus being spaced from the nave intermediate its zones of securement whereby there are provided a plurality of substantially annularly extending box cross sections.

8. A vehicle wheel including, in combination, a pressed metal single stamping artillery wheel body of the demountable bolted on type comprising a plurality of spokes merging into a substantially annular nave portion, said nave portion including a plurality of portions extending axially inwardly between adjoining spokes to form reenforcing webbings therebetween, and a portion extending axially outwardly into an axially outermost annular portion, and extending radially inwardly thereof into a substantially oppositely axially extending annular portion terminating inwardly thereof in a bolting on flange including a bolting on circle, and a reenforcing annulus telescoped within said reenforcing webbings, said annulus being secured in plural zones to said webbings and terminating radially inwardly thereof in an axially extending flange outwardly adjacent the bolting on circle.

9. A vehicle wheel comprising in combination, a single stamping hub demountable artillery wheel body having a plurality of spokes merging at their inner radial extremities into a substantially annular nave portion, said stamping extending radially inwardly thereof into a mounting flange, said mounting flange including substantially centrally thereof a bolt hole circle, said nave and flange portions defining a substantially annularly extending channel section portion and an annulus secured to said wheel body adjacent the radially outer periphery of said nave portion and extending radially inwardly to and terminating substantially at and secured to the outer periphery of said mounting flange in spaced relation to said channel section portion whereby to provide in said wheel body an annularly extending hollow portion of substantially box cross section.

10. A vehicle wheel comprising in combination, a single stamping demountable type artillery wheel body having a plurality of spokes merging at their inner radial extremities into a substantially annular nave portion, said stamping extending radially inwardly thereof into a mounting flange, said mounting flange including a plurality of annularly spaced bolt holes, said nave and flange portions defining a substantially annular channel section portion and an annulus secured to said wheel body adjacent the peripheries of said nave portion having portions thereof interlocked with said spokes and extending radially inwardly to and terminating substantially at and secured to the outer periphery of said mounting flange whereby to provide in said wheel body an annular hollow portion of substantially box cross section radially outwardly of the mounting flange.

11. A vehicle wheel comprising in combination, a single stamping demountable type artillery wheel body having a plurality of spokes merging at their inner radial extremities into a substantially annular nave portion, said stamping extending radially inwardly thereof into a mounting flange, said mounting flange including a bolt hole circle, said nave and flange portions defining a substantially annular channel section and an annulus secured to said wheel body adjacent the periphery of said nave portion and extending radially inwardly to and terminating substantially at and secured to the outer periphery of the mounting flange whereby to provide in said wheel body an annular hollow portion of substantially box cross section, the radially inner peripheries of said annulus and said wheel body forming radially spaced mounting seats at either side of the bolt hole circle.

12. A vehicle wheel comprising in combination, a rim, a single stamping hub demountable artillery wheel body having a plurality of spokes merging at their inner radial extremities into a substantially annular nave portion, said stamping extending radially inwardly of said nave portion into a mounting flange portion, said mounting flange including a plurality of annularly spaced bolt holes, said nave and flange portions defining a substantially annularly extending channel section portion and an annulus secured to said wheel body adjacent the outer periphery of said nave portion and extending radially inwardly to and terminating substantially at and secured to the outer periphery of said mounting flange and arranged to provide in said wheel body an annularly extending hollow portion of substantially box cross section, said annulus being corrugated in axial section and peripherally and having its corrugations extending between the spoke side walls.

13. A vehicle wheel comprising in combination, a rim, a single stamping hub demountable artillery wheel body comprising a plurality of spokes merging at their inner radial extremities into a substantially conical annularly extending nave portion, said stamping extending radially inwardly of said nave portion into a substantially radially extending mounting flange, said mounting flange having a plurality of annularly spaced bolt holes and an annulus secured adjacent the radially outer peripheries of the nave and mounting flange portions and arranged to form therewith a substantially annularly extending box section portion, said annulus being peripherally interlocked with the spokes and corrugated in axial section.

14. A vehicle wheel of the demountable bolted-on type including in combination, a single stamping artillery wheel body comprising a bolting-on flange, a conical spoke bearing portion radially outward of said bolting-on flange and a plurality of spokes merging at their inner radial extremities into said spoke bearing portion and deeply corrugating its periphery, a reenforcing annulus secured to the radially outer portion of said bolting-on flange and extending generally radially outwardly, the outer periphery of said annulus telescoping within the deeply corrugated periphery of the spoke bearing portion, and having projections extending some distance into the inner ends of the spokes and axially interlocking therewith, the outer periphery of said annulus being secured to said spoke bearing portion and spokes, but spaced in its main body from the body of the single stamping wheel body to form therewith a box section structure outwardly of the bolting-on flange.

CAROLUS L. EKSERGIAN.